United States Patent
Amizur et al.

(10) Patent No.: US 10,306,413 B2
(45) Date of Patent: May 28, 2019

(54) METHODS FOR COHERENT ANTENNA SWITCHING IN AOD POSITIONING SCHEME

(71) Applicant: Intel IP Corporation, Santa Clara, CA (US)

(72) Inventors: Yuval Amizur, Kfar-Saba (IL); Nir Dvorecki, Herzeliya (IL)

(73) Assignee: Intel IP Corporation, Santa Clara, CA (US)

( * ) Notice: Subject to any disclaimer, the term of this patent is extended or adjusted under 35 U.S.C. 154(b) by 128 days.

(21) Appl. No.: 15/276,503

(22) Filed: Sep. 26, 2016

(65) Prior Publication Data

US 2017/0215039 A1 Jul. 27, 2017

Related U.S. Application Data

(60) Provisional application No. 62/281,345, filed on Jan. 21, 2016, provisional application No. 62/299,692, filed on Feb. 25, 2016.

(51) Int. Cl.
| | |
|---|---|
| *H04W 4/02* | (2018.01) |
| *H04L 29/06* | (2006.01) |
| *G01S 3/48* | (2006.01) |
| *H04L 5/00* | (2006.01) |
| *H04W 4/04* | (2009.01) |
| *H04W 16/28* | (2009.01) |
| *H04B 7/0413* | (2017.01) |
| *H04W 64/00* | (2009.01) |
| *H04B 7/0452* | (2017.01) |

(52) U.S. Cl.
CPC .............. *H04W 4/025* (2013.01); *G01S 3/48* (2013.01); *H04L 5/0007* (2013.01); *H04L 69/22* (2013.01); *H04W 4/043* (2013.01); *H04W 16/28* (2013.01); *H04B 7/0413* (2013.01); *H04B 7/0452* (2013.01); *H04W 64/00* (2013.01); *H04W 64/003* (2013.01)

(58) Field of Classification Search
CPC ....... H04W 64/00; H04W 4/02; H04W 4/043; H04W 84/12; H04W 4/023; H04W 4/029; H04W 88/02; H04W 64/003; H04L 67/18; H04B 7/0413; H04B 7/0452; H04B 7/0617; H04B 17/27
See application file for complete search history.

(56) References Cited

U.S. PATENT DOCUMENTS

| | | | | |
|---|---|---|---|---|
| 2014/0295880 | A1* | 10/2014 | Ranki | G01S 3/18 455/456.1 |
| 2016/0366548 | A1* | 12/2016 | Wang | H04W 64/00 |

\* cited by examiner

*Primary Examiner* — Jae Y Lee
*Assistant Examiner* — Aixa A Guadalupe Cruz
(74) *Attorney, Agent, or Firm* — Schwegman Lundberg & Woessner, P.A.

(57) ABSTRACT

Devices and methods of estimating the AoD of a STA are generally described. The STA receives comparison symbols from a first AP antenna. The comparison symbols are received prior to and after switching of transmitter chains from a first set of antennas to a second set of antennas. AoD symbols are received immediately after the comparison symbols. A phase and amplitude correction is determined based on a phase and amplitude change between the comparison symbols and the second AoD symbol corrected based thereon. The AoD is subsequently estimated based on the symbol measurements.

16 Claims, 7 Drawing Sheets

FIG. 7

Packet 1: Symbol 1 — Transmit Headers; Symbol 2 — Transmit Using Antenna 1; ... Transmit Using Antennas 1,2,3,4

Packet 2: Transmit Headers; Transmit Using Antenna 1; ... Transmit Using Antennas 1,5,6,7

Symbol 1 — Transmit Headers / Transmit Using Antenna 1
Symbol 2 — Transmit Using Antenna 2
Symbol 3 — No Transmission
Symbol 4 — No Transmission
Symbol 5 — Transmit Using Antenna 3
Symbol 6 — Transmit Using Antenna 4

800

METHODS FOR COHERENT ANTENNA SWITCHING IN AOD POSITIONING SCHEME

PRIORITY CLAIM

This application claims the benefit of priority to U.S. Provisional Patent Application Ser. No. 62/281,345, filed Jan. 21, 2016, and entitled "APPARATUS, SYSTEM AND METHOD OF ANGLE OF DEPARTURE (AOD) ESTIMATION," and U.S. Provisional Patent Application Ser. No. 62/299,692, filed Feb. 25, 2016, and entitled "A METHOD OF USING LOW POWER WAKE-UP RADIO FOR SERVICE DISCOVERY," which are incorporated herein by reference in their entirety.

TECHNICAL FIELD

Embodiments pertain to wireless networks. Some embodiments relate to wireless local area networks (WLANs) and Wi-Fi networks including networks operating in accordance with the Institute of Electrical and Electronics Engineers (IEEE) 802.11 family of standards, such as the IEEE 802.11ac standard, the IEEE 802.11ax study group (SG) (named DensiFi) or IEEE 802.11 ay or IEEE 802.11az. Some embodiments relate to WiFi positioning of a station (STA).

BACKGROUND

The use of mobile communication devices (also referred to as stations (STAs)) continues to increase among all walks of modem society. The various uses and capabilities of STAs has continued to drive demand for a wide variety of networked STAs in a number of disparate environments. Many applications use aspects of the STA characteristics, such as the increasing processing ability and screen size, as well as environmental conditions to expand use at home and work. One of the most popular environmental conditions employed by applications and advertisers is STA location. In one particular, example the use of Angle of Departure (AoD) techniques may he to determine STA position. However, a number of issues remain with the equipment and accuracy used in AoD techniques.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

FIG, 2 illustrates components of a communication device in accordance with some embodiments.

Figure 3:
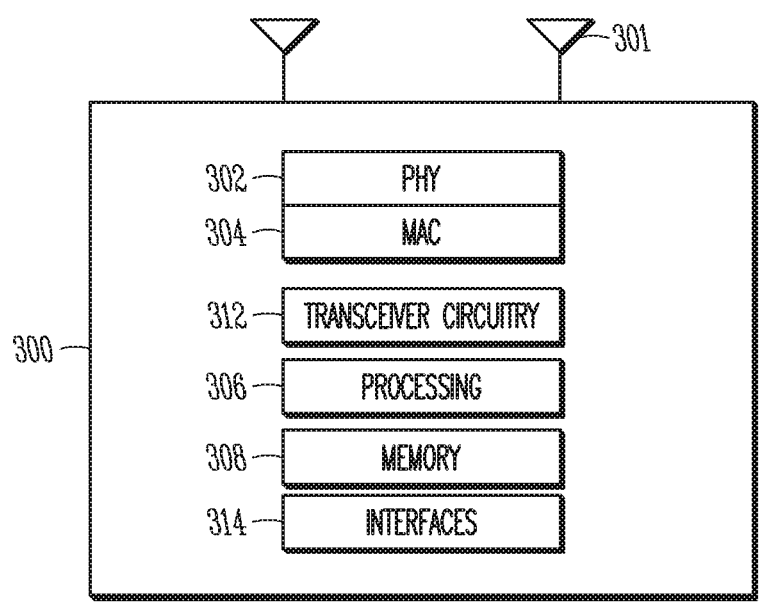

FIG. 3 illustrates a block diagram of a communication device in accordance with some embodiments.

Figure 4:
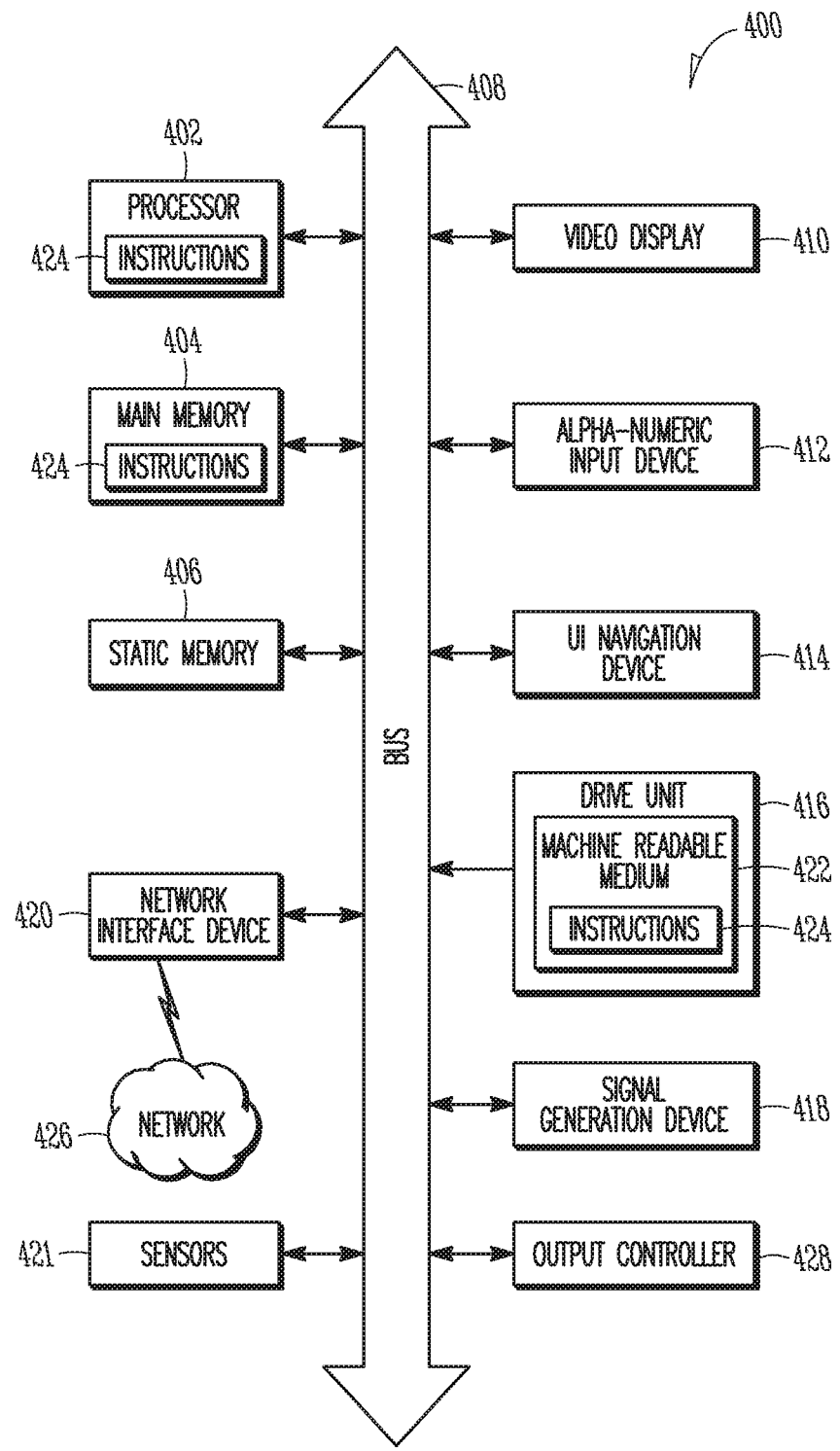

FIG. 4 illustrates another block diagram of a communication device in accordance with some embodiments.

Figures 5, 6:
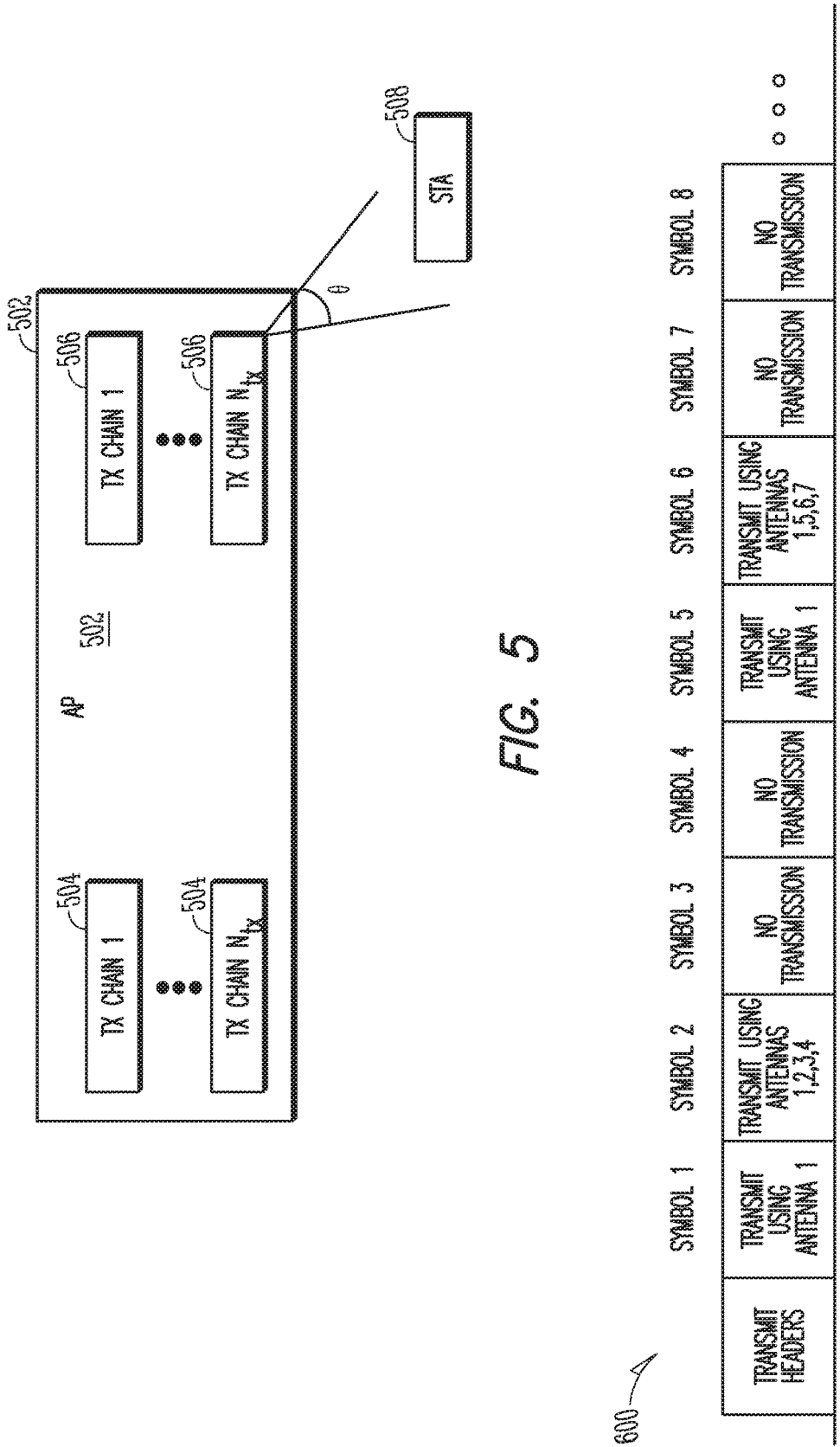

FIG. 5 illustrates a transmission from an access point (AP) at Angle of Departure (AoD) in accordance with some embodiments.

FIG. 6 is a calibration method transmission from an AP in accordance with some embodiments.

FIG. 7 is another calibration method transmission from an AP in accordance with some embodiments.

FIG. 8 is a relative phase method transmission from an AP in accordance with some embodiments.

FIG, 9 illustrates a method of determining AoD in accordance with some embodiments.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
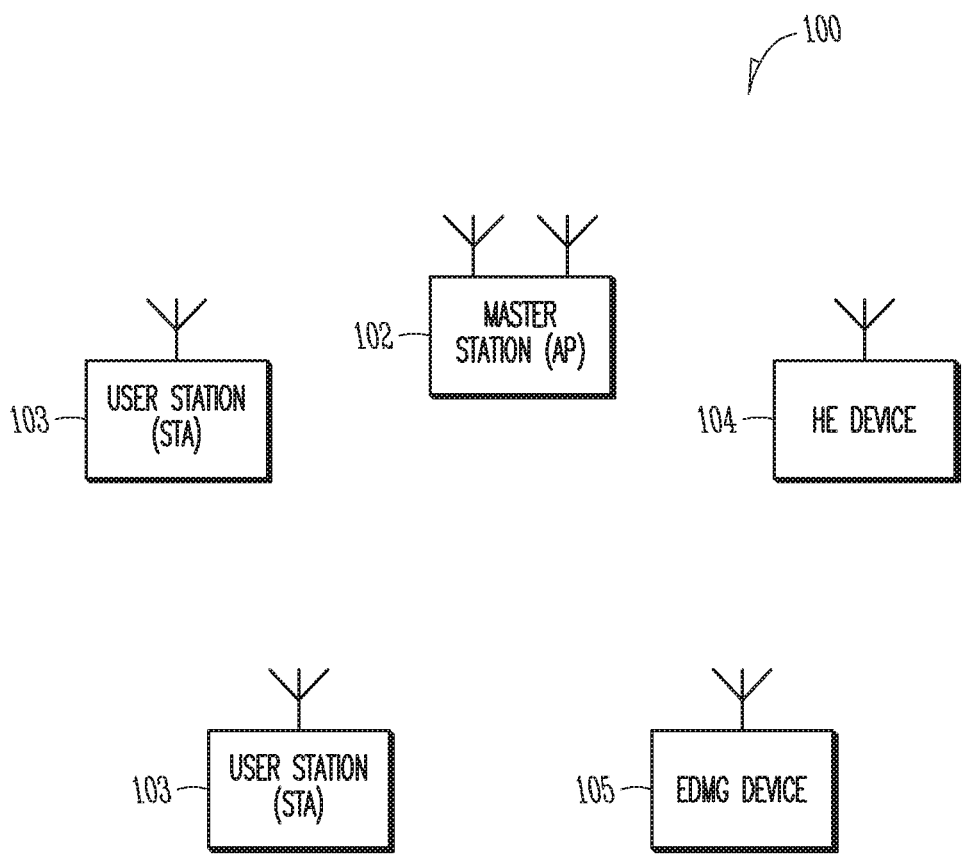
FIG. 1 is a functional diagram of a wireless network in accordance with some embodiments.

FIG. 1 illustrates a wireless network in accordance with some embodiments. Elements in the network 100 may engage in channel bonding, as described herein. In some embodiments, the network 100 may be an Enhanced Directional Multi Gigabit (EDMG) network. In some embodiments, the network 100 may be a High Efficiency Wireless Local Area Network (FIE) network. In some embodiments, the network 100 may be a Wireless Local Area Network (WLAN) or a Wi-Fi network. These embodiments are not limiting, however, as some embodiments of the network 100 may include a combination of such networks. As an example, the network 100 may support EDMG devices in some cases, non EDMG devices in some cases, and a combination of EDMG devices and non EDMG devices in some cases. As another example, the network 100 may support HE devices in some cases, non HE devices in some cases, and a combination of HE devices and non HE devices in some cases. As another example, some devices supported by the network 100 may be configured to operate according to EDMG operation and/or HE operation and/or legacy operation. Accordingly, it is understood that although techniques described herein may refer to a non EDMG device, an EDMG device, a non FIE device or an HE device, such techniques may be applicable to any or all such devices in some cases.

The network 100 may include any number (including zero) of master stations (STA) 102, user stations (STAs) 103 (legacy STAs), HE stations 104 (HE devices), and EDMG stations 105 (EDMG devices). It should be noted that in some embodiments, the master station 102 may be a stationary non-mobile device, such as an access point (AP). In sonic embodiments, the STAs 103 may be legacy stations. These embodiments are not limiting, however, as the STAs 103 may be FIE devices or may support HE operation in some embodiments. In some embodiments, the STAs 103 may be EDMG devices or may support EDMG operation. It should be noted that embodiments are not limited to the number of master STAs 102, STAs 103, HE stations 104 or EDMG stations 105 shown in the example network 100 in FIG. 1. Legacy STAs 103 may include, for example, non-HT STA (e.g., IEEE 802.11a/g stations), HT STA (e.g., IEEE 802.11n stations), and VHT STA (e.g., IEEE 802.11ac stations).

The master station 102 may be arranged to communicate with the STAs 103 and/or the HE STAs 104 and/or the EDMG STAs 105 in accordance with one or more of the IEEE 802.11 standards. In accordance with some embodiments, an AP may operate as the master station 102 and may be arranged to contend for a wireless medium (e.g., during a contention period) to receive exclusive control of the medium for a. HE control period (i.e., a. transmission opportunity (TXOP)). The master station 102 may, for example, transmit a master-sync or control transmission at the beginning of the HE control period to indicate, among other things, which HE stations 104 are scheduled for communication during the HE control period. During the HE control period, the scheduled HE stations 104 may communicate with the master station 102 in accordance with a non-contention based multiple access technique. In some embodiments, the STAs 103 may communicate in accordance with a contention-based communication technique, rather than a non-contention based multiple access technique. During the HE control period, the master station 102 may communicate with HE stations 104 using one or more HE frames. During the HE control period, STAs 103 not operating as HE devices may refrain from communicating in some cases. In some embodiments, the master-sync transmission may be referred to as a control and schedule transmission.

In some embodiments, the multiple-access technique used during the HE control period may be a scheduled orthogonal frequency division multiple access (OFDMA) technique, although this is not a requirement. In some embodiments, the multiple access technique may be a time-division multiple access (TDMA) technique or a frequency division multiple access (TDMA) technique. In some embodiments, the multiple access technique may be a space-division multiple access (SDMA) technique including a multi-user (MU) multiple-input multiple-output (MIMO) (MU-MIMO) technique. These multiple-access techniques used during the HE control period may be configured for uplink or downlink data communications.

The master station 102 may also communicate with STAs 103 and/or other legacy stations in accordance with legacy IEEE 802.11 communication techniques. In some embodiments, the master station 102 may also be configurable to communicate with the HE stations 104 outside the HE control period in accordance with legacy IEEE 802.11 communication techniques, although this is not a requirement.

In some embodiments, the HE communications during the HE control period may be configurable to use one of 20 MHz, 40 MHz, or 80 MHz contiguous bandwidths or an 80+80 MHz (160 MHz) non-contiguous bandwidth. In some embodiments, a 320 MHz channel width may be used. In some embodiments, subchannel bandwidths less than 20 MHz may also be used, in these embodiments, each channel or subchannel (or tone) of an HE communication may be configured for transmitting a number of spatial streams.

In some embodiments, EDMG communication may be configurable to use channel resources that may include one or more frequency bands of 2.16 GHz, 4.32 GHz or other bandwidth. Such channel resources may or may not be contiguous in frequency. As a non-limiting example, EDMG communication may be performed in channel resources at or near a carrier frequency of 60 GHz.

In some embodiments, primary channel resources may include one or more such bandwidths, which may or may not be contiguous in frequency. As a non-limiting example, channel resources spanning a 2.16 GHz or 4.32 GHz bandwidth may be designated as the primary channel resources. As another non-limiting example, channel resources spanning a 20 MHz bandwidth may be designated as the primary channel resources. In some embodiments, secondary channel resources may also be used, which may or may not be contiguous in frequency. As a non-limiting example, the secondary channel resources may include one or more frequency bands of 2.16 GHz bandwidth, 4.32 GHz bandwidth or other bandwidth. As another non-limiting example, the secondary channel resources may include one or more frequency bands of 20 MHz bandwidth or other bandwidth.

In some embodiments, the primary channel resources may be used for transmission of control messages, beacon frames or other frames or signals by the AP 102. As such, the primary channel resources may be at least partly reserved for such transmissions. In some cases, the primary channel resources may also be used for transmission of data payloads and/or other signals. In some embodiments, the transmission of the beacon frames may be restricted such that the AP 102 does not transmit beacons on the secondary channel resources. Accordingly, beacon transmission may be reserved for the primary channel resources and may be restricted and/or prohibited in the secondary channel resources, in some cases.

In accordance with some embodiments, a master station 102 and/or HE stations 104 may generate an HE packet in accordance with a short preamble format or a long preamble format. The HE packet may comprise a legacy signal field (L-SIG) followed by one or more high-efficiency (HE) signal fields (HE-SIG) and an HE long-training field (HE-LTF). For the short preamble format, the fields may be configured for shorter-delay spread channels. For the long preamble format, the fields may be configured for longer-delay spread channels. These embodiments are described in more detail below.

In some embodiments, channel bonding may be used in communications between the various devices, for example, the STAs 103. In channel bonding, two or more channels may be used simultaneously, e.g., in the same physical layer (PHY) packet to achieve higher throughput. Due to the directional nature of transmissions in the 60GHz hand, to use channel bonding a clear channel may he assessed before transmission. Thus, both sides of a particular link, i.e., the TXOP initiator and the TXOP responder, may assess the clear channel prior to transmission. Every wideband transmission opportunity may start with a Request to Send (RTS) and a Clear to Send (CTS) (RTS/CTS) protocol.

For example, a STA 103 may transmit a RTS message to the AP 102. After a Short Inter Frame Space (SIFS) period, if the medium is available, the AP 102 may respond to the RTS by broadcasting a CTS message. After the CTS message is received by the STA 103, the STA 103 may wait until a backoff counter reaches zero. The STA 103 may then transmit the data packet to the AP 102 during the TXOP. If the medium becomes busy before the backoff counter reaches zero, the STA 103 may sense when the medium again becomes available and transmit another RTS message to the AP 102.

After each transmission, the STA 103 may pick a new backoff time. Assuming the STA 103 received an acknowledgment (ACK) from the AP 102 indicating reception of the packet by the AP 102, if the backoff counter expires before the next packet arrives for transmission, the STA 103 can transmit after sensing the channel to be idle for the DIFS period. If the last transmission was unsuccessful, as evidenced by the lack of reception of the ACK by the STA 103, the STA 103 may wait for an Extended Inter Frame Space (EIFS) period, which is longer than the DIFS period. If the STA 103 has a data packet waiting for transmission and the backoff counter expires, but the carrier sensing detects that the carrier is occupied, the STA 103 may select a second backoff time for the backoff counter and transmit the packet when the second backoff time has expired.

In some embodiments, STAs may use a Short Inter Frame Space (SIFS) for the RTS/CTS message and for a positive ACK-based high priority transmission. Once the SIFS duration elapses, the transmission can immediately start. Depending on the physical layer configuration, the SITS duration may be 6, 10 or 28 µs. A PCF Inter Frame Space (PITS) may be used by the PCF during contention free operations. After the PIFS period elapses, STAs having data to be transmitted in contention free period can be initiated, preempting contention based traffic. The DIES period is the minimum idle time for contention based services. STAs may access the channel immediately if it is free after the DIFS period. The EIFS period may be used, as above, when there is erroneous frame transmission. The Arbitration Inter Frame Space period (AIFS) may be used by QoS STAs to transmit all frames (data and control).

In particular, the CCA process may be performed by the physical layer. The physical layer can be divided into two sublayers. The sublayers may include the physical medium dependent (PMD, lower sublayer) and the physical layer convergence procedure (PLCP, upper sublayer). The physical layer may determine whether the channel is clear and communicate this to the MAC layer. The PMD may indicate to the PLCP sublayer whether the medium is in use. The PLCP sublayer may communicate with the MAC layer to indicate a busy or idle medium, which may prevent the MAC layer from attempting* to forward a frame for transmission. CCA, may include both energy detection (ED) and CS. For the CS CCA process, the STA 103 may detect and decode a WiFi preamble from the PLCP header field. For the ED CCA process, the STA 103 may detect non-WiFi energy in the operating channel and backoff data transmission. The ED threshold may be dependent in some embodiments on the channel width. If the non-WiFi energy exceeds the ED threshold for a predetermined amount of time, the STA 103 may determine that the medium is busy until the energy is below the threshold.

Figure 2:
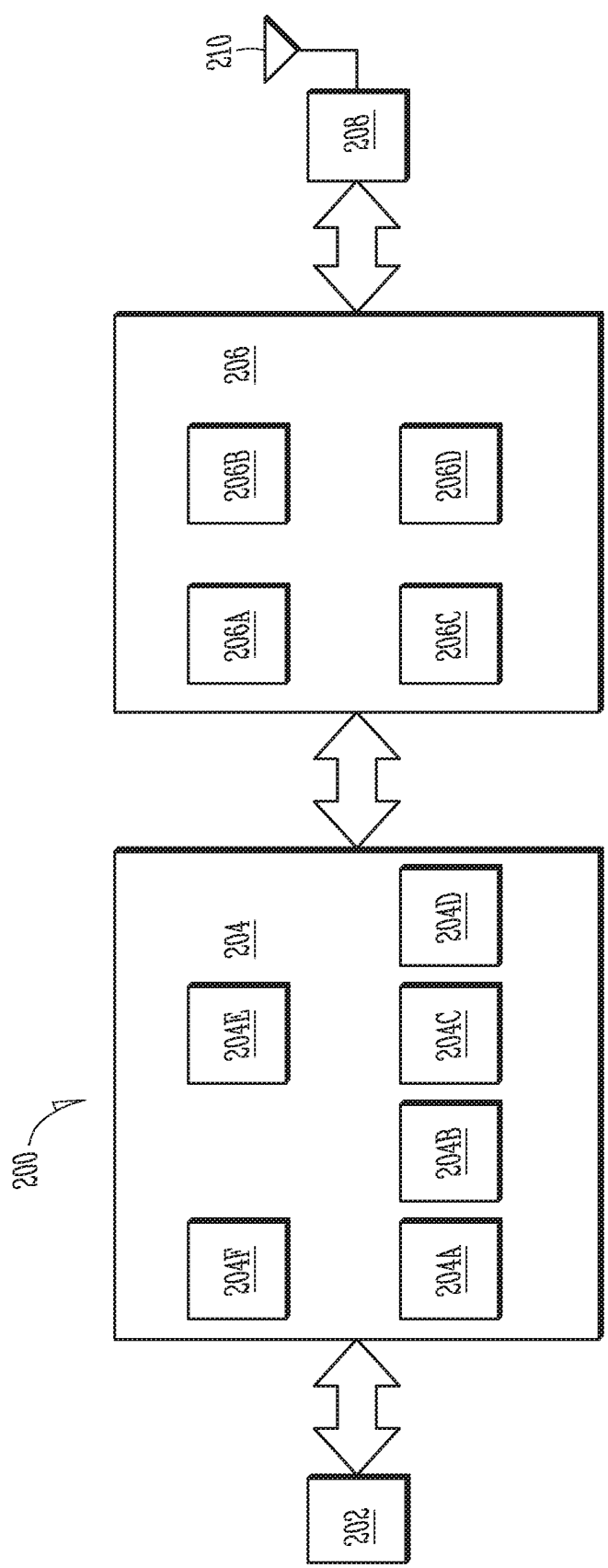

FIG. 2 illustrates components of a communication device in accordance with some embodiments. The communication device 200 may be one of the UEs 102a or STAs 103 or some other network component. The communication device 200 may be a stationary, non-mobile device or may be a mobile device. In some embodiments, the UE 200 may include application circuitry 202, baseband circuitry 204, Radio Frequency (RF) circuitry 206, front-end module (FEM) circuitry 208 and one or more antennas 210, coupled together at least as shown. At least some of the baseband circuitry 204, RF circuitry 206, and FEM circuitry 208 may form a transceiver. In some embodiments, other network elements, such as an eNB or AP may contain some or all of the components shown in FIG. 2.

The application or processing circuitry 202 may include one or more application processors. For example, the application circuitry 202 may include circuitry such as, but not limited to, one or more single-core or multi-core processors. The processor(s) may include any combination of general-purpose processors and dedicated processors(e.g., graphics processors, application processors, etc.). The processors may be coupled with and/or may include memory/storage and may be configured to execute instructions stored in the memory/storage to enable various applications and/or operating systems to run on the system.

The baseband circuitry 204 may include circuitry such as, but not limited to, one or more single-core or multi-core processors. The baseband circuitry 204 may include one or more baseband processors and/or control logic to process baseband signals received from a receive signal path of the RF circuitry 206 and to generate baseband signals for a transmit signal path of the RF circuitry 206. Baseband processing circuitry 204 may interface with the application circuitry 202 for generation and processing of the baseband signals and for controlling operations of the RF circuitry 206. For example, in sonic embodiments, the baseband circuitry 204 may include a second generation (2G) baseband processor 204a, third generation (3G) baseband processor 204b, fourth generation (4G) baseband processor 204c, and/or other baseband processor(s) 204d for other existing generations, generations in development or to be developed in the future (e.g., fifth generation (5G), 5G, etc). The baseband circuitry 204 (e.g., one or more of baseband processors 204a-d) may handle various radio control functions that enable communication with one or more radio networks via the RF circuitry 206. The radio control functions may include, but are not limited to, signal modulation/demodulation, encoding/decoding, radio frequency shifting, etc. In some embodiments, modulation/demodulation circuitry of the baseband circuitry 204 may include FFT, precoding, and/or constellation mapping/demapping functionality. In some embodiments, encoding/decoding circuitry of the baseband circuitry 204 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 204 may include elements of a protocol stack such as, for example, elements of an EUTRAN protocol including, for example, physical (PHY), media access control (MAC), radio link control (RLC), packet data convergence protocol (PDCP), and/or radio resource control (RRC) elements. A central processing unit (CPU) 204e of the baseband circuitry 204 may be configured to run elements of the protocol stack for signaling of the PHY, MAC, RLC, PDCP and/or RRC layers. In some embodiments, the baseband circuitry may include one or more audio digital signal processor(s) (DSP) 204f. The audio DSP(s) 204f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 204 and the application circuitry 202 may be implemented together such as, for example, on a system on a chip (SOC).

In some embodiments, the baseband circuitry 204 may provide for communication compatible with one or more radio technologies. For example, in some embodiments, the baseband circuitry 204 may support communication with an EUTRAN and/or other wireless metropolitan area networks (WMAN), a wireless local area network (WLAN), a wireless personal area network (WPAN). Embodiments in which the baseband circuitry 204 is configured to support radio communications of more than one wireless protocol may be referred to as multi-mode baseband circuitry. In some embodiments, the device can be configured to operate in accordance with communication standards or other protocols or standards, including Institute of Electrical and Electronic Engineers (IEEE) 802.16 wireless technology (Wi-Max), IEEE 802.11 wireless technology (WiFi) including IEEE 802.11 ad, which operates in the 60 GHz millimeter wave spectrum, various other wireless technologies such as global system for mobile communications (GSM), enhanced data rates for GSM evolution (EDGE), GSM EDGE radio access network (GERAN), universal mobile telecommunications system (UMTS), UMTS terrestrial radio access network (UTRAN), or other 2G, 3G, 4G, 5G, etc. technologies either already developed or to be developed.

RF circuitry 206 may enable communication with wireless networks using modulated electromagnetic radiation through a non-solid medium. In various embodiments, the RF circuitry 206 may include switches, filters, amplifiers, etc. to facilitate the communication with the wireless network. RF circuitry 206 may include a receive signal path which may include circuitry to down-convert RF signals received from the FEM circuitry 208 and provide baseband signals to the baseband circuitry 204. RF circuitry 206 may also include a transmit signal path which may include circuitry to up-convert baseband signals provided by the baseband circuitry 204 and provide RF output signals to the FEM circuitry 208 for transmission.

In some embodiments, the RF circuitry 206 may include a receive signal path and a transmit signal path. The receive signal path of the RF circuitry 206 may include mixer circuitry 206a, amplifier circuitry 206b and filter circuitry 206c. The transmit signal path of the RF circuitry 206 may include filter circuitry 206c and mixer circuitry 206a. RF circuitry 206 may also include synthesizer circuitry 206d for synthesizing a frequency for use by the mixer circuitry 206a of the receive signal path and the transmit signal path. In some embodiments, the mixer circuitry 206a of the receive signal path may be configured to down-convert RF signals received from the FEM circuitry 208 based on the synthesized frequency provided by synthesizer circuitry 206d The amplifier circuitry 206b may be configured to amplify the down-converted signals and the filter circuitry 206c may be a low-pass filter (LPF) or band-pass filter (BPF) configured to remove unwanted signals from the down-converted signals to generate output baseband signals. Output baseband signals may be provided to the baseband circuitry 204 for further processing. In some embodiments, the output baseband signals may be zero-frequency baseband signals, although this is not a requirement. In some embodiments, mixer circuitry 206a of the receive signal path may comprise passive mixers, although the scope of the embodiments is not limited in this respect.

In some embodiments, the mixer circuitry 206a of the transmit signal path may be configured to up-convert input baseband signals based on the synthesized frequency provided by the synthesizer circuitry 206d to generate RF output signals for the FEM circuitry 208. The baseband signals may be provided bye the baseband circuitry 204 and may be filtered by filter circuitry 206c. The filter circuitry 206c may include a low-pass filter (LPF), although the scope of the embodiments is not limited in this respect.

in some embodiments, the mixer circuitry 206a of the receive signal path and the mixer circuitry 206a of the transmit signal path may include two or more mixers and may be arranged for quadrature downconversion and/or upconversion respectively. In some embodiments, the mixer circuitry 206a of the receive signal path and the mixer circuitry 206a of the transmit signal path may include two or more mixers and may be arranged for image rejection (e.g., Hartley image rejection). In some embodiments, the mixer circuitry 206a of the receive signal path and the mixer circuitry 206a may be arranged for direct downconversion and/or direct upconversion, respectively. In some embodiments, the mixer circuitry 206a of the receive signal path and the mixer circuitry 206a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 206 may include analog-to-digital converter (ADC) and digital-to-analog converter (DAC) circuitry and the baseband circuitry 204 may include a digital baseband interface to communicate with the RF circuitry 206.

In some dual-mode embodiments, a separate radio IC circuitry may be provided for processing signals for each spectrum, although the scope of the embodiments is not limited in this respect.

In some embodiments, the synthesizer circuitry 206d may be a fractional-N synthesizer or a fractional N/N+1 synthesizer, although the scope of the embodiments is not limited in this respect as other types of frequency synthesizers may be suitable. For example, synthesizer circuitry 206d may be a delta-sigma synthesizer, a frequency multiplier, or a synthesizer comprising a phase-locked loop with a frequency divider.

The synthesizer circuitry 206d may be configured to synthesize an output frequency for use by the mixer circuitry 206a of the RF circuitry 206 based on a frequency input and a divider control input. In some embodiments, the synthesizer circuitry 206d may be a fractional N/N+1 synthesizer.

In some embodiments, frequency input may be provided by a voltage controlled oscillator (VCO), although that is not a requirement. Divider control input may be provided by either the baseband circuitry 204 or the applications processor 202 depending on the desired output frequency. In some embodiments, a divider control input (e.g., N) may be determined from a look-up table based on a channel indicated by the applications processor 202.

Synthesizer circuitry 206d of the RF circuitry 206 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 206d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency ($f_{LO}$). In some embodiments, the RF circuitry 206 may include an IQ/polar converter.

FEM circuitry 208 may include a receive signal path which may include circuitry configured to operate on RF signals received from one or more antennas 210, amplify the received signals and provide the amplified versions of the received signals to the RF circuitry 206 for further processing. FEM circuitry 208 may also include a transmit signal path which may include circuitry configured to amplify signals for transmission provided by the RF circuitry 206 for transmission by one or more of the one or more antennas 210.

In some embodiments, the FEM circuitry 208 may include a TX/RX switch to switch between transmit mode and receive mode operation. The FEM circuitry may include a receive signal path and a transmit signal path. The receive signal path of the FEM circuitry may include a low-noise amplifier (LNA) to amplify received. RF signals and provide the amplified received RF signals as an output (e.g., to the RF circuitry 206). The transmit signal path of the FEM circuitry 208 may include a power amplifier (PA) to amplify input RF signals (e.g., provided by RF circuitry 206), and one or more filters to generate RF signals for subsequent transmission (e.g., by one or more of the one or more antennas 210.

In some embodiments, the communication device 200 may include additional elements such as, for example, memory/storage, display, camera, sensor, and/or input/output (I/O) interface as described in more detail below. In some embodiments, the communication device 200 described herein may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), or other device that may receive and/or transmit information wirelessly. In some embodiments, the communication device 200 may include one or more user interfaces designed to enable user interaction with the system and/or peripheral component interfaces designed to enable peripheral component interaction with the system. For example, the communication device 200 may include one or more of a keyboard, a keypad, a touchpad, a display, a sensor, a non-volatile memory port, a universal serial bus (USB) port, an audio jack, a power supply interface, one or more antennas, a graphics processor, an application processor, a speaker, a microphone, and other I/O components. The display may be an LCD or LED screen including a touch screen. The sensor may include a gyro sensor, an accelerometer, a proximity sensor, an ambient light sensor, and a positioning unit. The positioning unit may communicate with components of a positioning network, e.g., a global positioning system (GPS) satellite.

The antennas 210 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 210 may be effectively separated to take advantage of spatial diversity and the different channel characteristics that may result, Although the communication device 200 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

FIG. 3 is a block diagram of a communication device in accordance with some embodiments. The communication device 300 may be a STA 103 or AP 102 shown in FIG. 1. In addition, the communication device 300 may also be suitable for use as an HE device 104 as shown in FIG. 1, such as an HE station. In some embodiments, the communication device 300 may be suitable for use as an EDMG device 105 as shown in FIG. 1, such as an EDMG station. Some of the components shown in FIG. 3 may not be present in all of the devices in FIG. 1.

The communication device 300 may include physical layer circuitry 302 for enabling transmission and reception of signals to and from the master station 102, HE devices 104, EDMG devices 105, other STAs 103, APs and/or other devices using one or more antennas 201. The physical layer circuitry 302 may perform various encoding and decoding functions that may include formation of baseband signals for transmission and decoding of received signals. The communication device 300 may also include medium access control layer (MAC) circuitry 304 for controlling access to the wireless medium. The communication device 300 may also include processing circuitry 306, such as one or more single-core or multi-core processors, and memory 308 arranged to perform the operations described herein. The physical layer circuitry 302, MAC circuitry 304 and processing circuitry 306 may handle various radio control functions that enable communication with one or more radio networks compatible with one or more radio technologies. The radio control functions may include signal modulation, encoding, decoding, radio frequency shifting, etc. For example, similar to the device shown in FIG. 2., in some embodiments, communication may be enabled with one or more of a WMAN, a WLAN, and a WPAN. In some embodiments, the communication device 300 can be configured to operate in accordance with 3GPP standards or other protocols or standards, including WiMax, WiFi, GSM, EDGE, GERAN, UMTS, UTRAN, or other 3G, 3G, 4G, 5G, etc. technologies either already developed or to be developed. The communication device 300 may include transceiver circuitry 312 to enable communication with other external devices wirelessly and interfaces 314 to enable wired communication with other external devices. As another example, the transceiver circuitry 312 may perform various transmission and reception functions such as conversion of signals between a baseband range and a Radio Frequency (RF) range.

The antennas 301 may comprise one or more directional or omnidirectional antennas, including, for example, dipole antennas, monopole antennas, patch antennas, loop antennas, microstrip antennas or other types of antennas suitable for transmission of RF signals. In some MIMO embodiments, the antennas 301 may be effectively separated to take advantage of spatial diversity and the different channel characteristics that may result.

Although the communication device 300 is illustrated as having several separate functional elements, one or more of the functional elements may be combined and may be implemented by combinations of software-configured elements, such as processing elements including DSPs, and/or other hardware elements. For example, some elements may comprise one or more microprocessors, DSPs, FPGAs, ASICs, RFICs and combinations of various hardware and logic circuitry for performing at least the functions described herein. In some embodiments, the functional elements may refer to one or more processes operating on one or more processing elements. Embodiments may be implemented in one or a combination of hardware, firmware and software. Embodiments may also be implemented as instructions stored on a computer-readable storage device, which may be read and executed by at least one processor to perform the operations described herein.

In some embodiments, the communication device 300 may be configured as an HE device 104 (FIG. 1) and/or an EDMG device 105 (FIG. 1), and may communicate using OFDM communication signals over a multicarrier communication channel. Accordingly, in some cases the communication device 300 may be configured to receive signals in accordance with specific communication standards, such as the Institute of Electrical and Electronics Engineers (IEEE) standards including IEEE 802.11-2012, 802.11n-2009 and/or 802.11ac-2013 standards and/or proposed specifications for WLANs including proposed HE standards and/or proposed EDMG standards, although the scope of the application is not limited in this respect as they may also be suitable to transmit and/or receive communications in accordance with other techniques and standards. In some other embodiments, the communication device 300 configured as an HE device 104 may be configured to receive signals that were transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/for frequency-division multiplexing (FDM) modulation, although the scope of the embodiments is not limited in this respect.

In accordance with embodiments, the STA 103 may transmit a grant frame to indicate a transmission of a data payload by the STA 103 during a grant period. The grant frame may indicate whether the data payload is to be transmitted on primary channel resources or on secondary channel resources. The STA 103 may transmit the data payload to a destination STA 103 on the secondary channel resources when the grant frame indicates that the data payload is to be transmitted on the secondary channel resources. The grant frame may be transmitted on the primary channel resources and on the secondary channel resources when the grant frame indicates that the data payload is to be transmitted on the secondary channel resources. When the grant frame indicates that the data payload is to be transmitted on the primary channel resources, the grant frame may be transmitted on the primary channel resources and the STA 103 may refrain from transmission of the grant frame on the secondary channel resources. These embodiments will be described in more detail below.

In some embodiments, the channel resources may be used for downlink transmission by the AP 102 and for uplink transmissions by the STAs 103. That is, a time-division duplex (TDD) format may be used. In some embodiments, the channel resources may be used for direct communication between one or more STAs 103. For instance, the STAs 103 may be configured to communicate in a peer-to-peer (P2P) mode. As another example, the STAs 103 may be configured to communicate in a non Port Control Protocol/AP (non-PCP/AP) mode.

In some cases, the channel resources may include multiple channels, such as the 20 MHz channels or 2.16 GHz channels previously described. The channels may include multiple sub-channels or may be divided into multiple sub-channels for the uplink transmissions to accommodate multiple access for multiple STAs 103. The downlink transmissions and/or the direct transmissions between STAs 103 may or may not utilize the same format.

In some embodiments, the sub-channels may comprise a predetermined bandwidth. As a non-limiting example, the sub-channels may each span 2.03125 MHz, the channel may span 20 MHz, and the channel may include eight or nine sub-channels. Although reference may be made to a sub-channel of 2.03125 MHz for illustrative purposes, embodiments are not limited to this example value, and any suitable frequency span for the sub-channels may be used. In sonic embodiments, the frequency span for the sub-channel may be based on a value included in an 802.11 standard (such as 802.11ax and/or 802.11ay), a 3GPP standard or other standard.

In some embodiments, the sub-channels may comprise multiple sub-carriers. Although not limited as such, the sub-carriers may be used for transmission and/or reception of OFDM or OFDMA signals. As an example, each sub-channel may include a group of contiguous sub-carriers spaced apart by a pre-determined sub-carrier spacing. As another example, each sub-channel may include a group of non-contiguous sub-carriers. That is, the channel may be divided into a set of contiguous sub-carriers spaced apart by the pre-determined sub-carrier spacing, and each sub-channel may include a distributed or interleaved subset of those sub-carriers. The sub-carrier spacing may take a value such as 78.125 kHz, 312.5 kHz or 15 kHz, although these example values are not limiting. Other suitable values that may or may not be part of an 802.11 or 3GPP standard or other standard may also be used in some cases. As an example, for a 78.125 kHz sub-carrier spacing, a sub-channel may comprise 26 contiguous sub-carriers or a bandwidth of 2.03125 MHz.

FIG. 4 illustrates another block diagram of a communication device in accordance with some embodiments. In alternative embodiments, the communication device 400 may operate as a standalone device or may be connected (e.g., networked) to other communication devices. In a networked deployment, the communication device 400 may operate in the capacity of a server communication device, a client communication device, or both in server-client network environments. In an example, the communication device 400 may act as a peer communication device in peer-to-peer (P2P) (or other distributed) network environment. The communication device 400 may be a UE, eNB, AP, STA, PC, a tablet PC, a STB, a PDA, a mobile telephone, a smart phone, a web appliance, a network router, switch or bridge, or any communication device capable of executing instructions (sequential or otherwise) that specify actions to be taken by that communication device. Further, while only a single communication device is illustrated, the term "communication device" shall also be taken to include any collection of communication devices that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a communication device readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Communication device (e.g., computer system) 400 may include a hardware processor 402 (e.g., a central processing unit (CPU), a graphics processing unit (GPU), a hardware processor core, or any combination thereof), a main memory 404 and a static memory 406, some or all of which may communicate with each other via an interlink (e.g., bus) 408. The communication device 400 may further include a display unit 410, an alphanumeric input device 412 (e.g., a keyboard), and a user interface (UI) navigation device 414 (e.g., a mouse). In an example, the display unit 410, input device 412 and UI navigation device 414 may be a touch screen display. The communication device 400 may additionally include a storage device (e.g., drive unit) 416, a signal generation device 418 (e.g., a speaker), a network interface device 420, and one or more sensors 421, such as a global positioning system (GPS) sensor, compass, accelerometer, or other sensor. The communication device 400 may include an output controller 428, such as a serial (e.g., universal serial bus (USB), parallel, or other wired or wireless (e.g., infrared (IR), near field communication (NFC), etc. connection to communicate or control one or more peripheral devices (e.g., a printer, card reader, etc.).

The storage device 416 may include a communication device readable medium 422 on which is stored one or more sets of data, structures or instructions 424 (e.g., software) embodying or utilized by any one or more of the techniques or functions described herein. The instructions 424 may also reside, completely or at least partially, within the main memory 404, within static memory 406, or within the hardware processor 402 during execution thereof by the communication device 400. In an example, one or any combination of the hardware processor 402, the main memory 404, the static memory 406, or the storage device 416 may constitute communication device readable media.

While the communication device readable medium 422 is illustrated as a single medium, the term "communication device readable medium" may include a single medium or multiple media (e.g., a centralized or distributed database, and/or associated caches and servers) configured to store the one or more instructions 424.

The term "communication device readable medium" may include any medium that is capable of storing, encoding, or carrying instructions for execution by the communication device 400 and that cause the communication device 400 to perform any one or more of the techniques of the present disclosure, or that is capable of storing, encoding or carrying data structures used by or associated with such instructions. Non-limiting communication device readable medium examples may include solid-state memories, and optical and magnetic media. Specific examples of communication device readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, communication device readable media may include non-transitory communication device readable media. In some examples, communication device readable media may include communication device readable media that is not a transitory propagating signal.

The instructions 424 may further be transmitted or received over a communications network 426 using a transmission medium via the network interface device 420 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., IEEE 802.11 family of standards, IEEE 802.16 family of standards), IEEE 802.15.4 family of standards, a LTE family of standards, a Universal Mobile Telecommunications System (UMTS) family of standards, peer-to-peer (P2P) networks, among others. In an example, the network interface device 420 may include one or more physical jacks (e.g., Ethernet, coaxial, or phone jacks) or one or more antennas to connect to the communications network 426 In an example, the network interface device 420 may include a plurality of antennas to wirelessly communicate using at least one of single-input multiple-output (SINK)), MIMO, or multiple-input single-output (MISO) techniques. In some examples, the network interface device 420 may wirelessly communicate using Multiple User MIMO techniques. The term "transmission medium" shall be taken to include any intangible medium that is capable of storing, encoding or carrying instructions for execution by the communication device 400, and includes digital or analog communications signals or other intangible medium to facilitate communication of such software.

As above, there are a number of positioning techniques in IEEE 802.11 that may be used to determine the location of a STA. These techniques include Angle of Arrival (AoA) and Angle of Departure (AoD), in which downlink transmissions from the AP may be measured at an antenna array of the STA or uplink transmissions of the STA may be measured at an antenna array of the AP. The AoD/AoA is the angle between the transmission/reception direction of a reference signal from a linear antenna array and the normal axis of the array. In some cases, the Time Difference of Arrival (TDOA) may be measured at individual elements of the array. The received AP signal between successive antenna elements may be phase-shifted, and the degree of phase shift may depend on the AoD/AoA, the antenna element spacing, and the carrier frequency. By measuring the phase shift and using known AP characteristics, the AoD/AoA can be determined. In the embodiments described, the AP is referred to as having transmitted the symbols, although in other embodiments other wireless devices, such as another STA or other wireless devices may transmit the symbols.

One issue with using AoA is that for user STAs, such as cell phones, the AoA may change dependent on the orientation of the STA, which may constantly move. Thus, AoD may be a more useful overall technique to use for all types of STAs. Focusing in particular on AoD techniques, to improve scalability for position determination, an AoD technique may be used in which the AP is the only device transmitting at a particular point in time, with the STAs only being listeners. This may remove the dependency of the number of location transmissions on the number of STAs. Typically when using the AoD technique, the AP may transmit preambles from an antenna array while switching antennas to transmit different packets. The receiving STA, e.g., a mobile device, may decode these preambles and use the decoded information to estimate the AoD. The STA may thus perform a major part of the positioning calculation. Moreover, to perform the calculations, the STA may have previously obtained calibration data of the antennas from the AP and to store this information in a memory of the STA. The calibration data may include the relationship between the angle and phase of every antenna elements in the antenna array for each angle. This methodology may thus trade a reduction in the amount of network traffic to perform the STA positioning with an increase of work being performed by the STA, as well as an increased memory load with increasing numbers of antennas in the antenna array or increasing numbers of antenna arrays are used.

An AoD estimation method may be used in which one or more APs may be configured to transmit signals to one or more STAs in a plurality of discrete directions and having a predefined order. The STA may then look for the signal with the strongest (and perhaps earliest) direction. The AoD estimation method may be single sided, that is the AP(s) is the only transmitter and the STA acting only as a receiver (no transmissions). Thus, there may be a defined relationship between the direction and timing of the transmissions, and in some circumstances, the signal characteristics. The AoD technique may use preambles to transmit one or more symbols on different tones or may use data frames to transmit the symbols on the different tones, and the different tones and/or symbols transmitted on different angles.

The STA may be configured to detect one or more of the tones that have a particular characteristic or combination of characteristics. For example, the STA may detect the strongest tone and/or a predetermined timing, such as the earliest tone. The latter may be useful when a large number of clusters or other scatterers are present, perhaps causing the strongest tone to shift while the earliest arriving tone remains the tone being received via the most direct route (line of sight). The earliest tone may be used in sonic embodiments to discriminate between multiple tones When the tones have a signal strength within a predetermined range of each other and/or when a large number of scatterers are present. The AP may use, in total, 117 tones having a bandwidth of 40 MHz and a length of 4 ms. In other embodiments, for WiFi the number of tones may be variable with the bandwidth. For 40 MHz, for example, there may be only 108 available subcarriers in the data symbols. Several tones (as predefined by the standard as pilot tones) can still be used for phase and amplitude tracking. This may be done for each data symbol to help against certain impairments of the STAs; such pilots can thus be expected to still be used in the AoD symbols. Moreover, the length of the symbol may be variable—in 802.11a/b/g/n/ac it can be 3.6 µs to 4 µs. For 802.11ax (which is currently being developed), the symbol duration can range from 3.2 µs to 16 µs.

The AP may transmit OFDM symbols in the plurality of directions. In particular, the AP may be configured to simultaneously transmit each OFDM symbol (or set of OFDM symbols) using a different tone, or more than one OFDM symbol or tone, in a different direction according to a pattern known to the STA. Each tone transmitted in a particular direction may be unique, that is, different from each other tone transmitted in each other direction. An AoD estimation method may be used in which one or more APs may be configured to transmit signals to one or more STAs in a plurality of discrete directions and having a predefined order.

Simultaneous transmission using all of the AP antennas, while allowing simple estimation of AoD by the receiver, may be costly and complex. In other embodiments, only a few or even a single transmit chain may be used for multiple antenna, allowing the signals to be transmitted at different times by switching the AP transmit chains between all available antennas. Thus, instead of transmitting a single symbol simultaneously using each antenna, each symbol may be transmitted using different sets of antennas at different times. The STA may receive and buffer the symbols. The STA may then sum the buffered symbols into a single symbol, thus emulating an AP with a large number of transmit chains. The reception of the buffered symbols may occur over a relatively short time period, and thus the channel between the STA and AP may be linear and time-invariant. The result of the summation of the symbols into a single symbol by the STA may thus be equivalent to the result of transmitting a single symbol simultaneously from all the AP's antennas. One or more buffers whose total memory is the size of an OFDM signal may be sufficient to sum a new symbol, continuing until all symbols are received from the AP.

While the channel may remain substantially constant, however, switching of the antennas during the packet can take several µs. During this time, the switching process may introduce artificialities into the transmitted signal. To this end, the AP may indicate to the STA to ignore a predetermined number of symbols between each of the times in which the AP transmits through different antennas. During these times, the AP may be expected to be transmitting non-valid signals or even stopping the transmission entirely, until it finishes its switching process. In some embodiments, the AP may transmit an announcement frame before transmitting the packet which is used for the AoD estimation. The announcement frame may contain a variety of information for use by the STA, including the number of symbols transmitted between each switching operation, the number of symbols used for the switching operation, the codebook that maps the tones in each symbol to their respective physical angles if not set by the standard, and optionally data regarding calibration and/or beamshape patterns that can be used by the STA for the estimation process. In other embodiments, some or all of this information may be contained within header fields of the header.

Either method (simultaneous or sequential transmission) may assume that all AP antennas are calibrated and no phase shift errors exist during the time it takes for the switching to complete so that the switching process does not affect the actual data transmitted after switching. In a real system, however, after each switching process, a global unknown phase may be added to all transmit chains due to a phase shift in time. Phase shift errors in general can be caused by a few factors, such as frequency offset between the AP (transmitter) and STA (receiver). Moreover, the switching from one set of antennas to the next can cause extra phase and amplitude errors. While pilot tones may be used by the STA to track these changes, no valid data can be transmitted during the switching process. Thus, standard phase and amplitude tracking may be unable to be employed.

In addition, some systems are unable to perform switching during an active transmission. Instead, several packets may be transmitted by the AP, each from a different set of antennas. The amplitude and phase can change drastically between the packets, which may introduce even greater amplitude and phase changes to be corrected.

Moreover, sufficiently accurate calibration of large antenna arrays may not be possible. Unfortunately, all antennas are expected to be calibrated such that their phases and amplitude gains are known. As the size of the antenna array grows, this process may become increasingly difficult since the calibration is to be performed simultaneously on all of the antennas.

In some receivers such as STAs, buffering and processing of all of the preamble symbols may not be possible without resorting to using multiple packets. Notably, the current 802.11ac standard supports non-data packets with up to 8 preambles, so many systems have been designed to only handle 8 preambles at a time. This may introduce further phase and amplitude distortions.

Thus, calibration difficulties and phase shift (drift) errors may exist in the above AoD determination methods. To handle these errors, a phase and amplitude sync method and/or a relative phase method may be performed. The phase and amplitude sync method may synchronize the phase and amplitude of the transmitted signal after each switching process. In one embodiment, the transmitter may transmit the same symbol from a predefined antenna before and after each switching process. The receiver may use this symbol to track the phase and amplitude differences due to the switching process. In the relative phase method, on the other hand, syncing may be avoided. Instead, the receiver may use the relative phases between received symbols to eliminate (or be invariant to) unknown phase changes caused by the switching process. In one example, the relative phase of pairs of received symbols may be used. One or both methods also support switching during an active transmission, as well as switching antennas in between packets. The transmit chains of the transmitter may be calibrated to have a known phase and amplitude in relation to the other. Moreover, phase shift (drift) errors caused by the time to perform the switching process may be reduced.

FIG. 5 illustrates a transmission from an AP at an AoD in accordance with some embodiments. The AP 502 and STA 508 may be any of the devices shown in FIGS. 1-4. The AP 502 may have multiple antenna elements, for example, arranged in an antenna array. The AP 502 may transmit OFDM symbols at an AoD of θ to the STA 508. The AoD may depend on the number of transmissions by the AP 502 or the number of antennas in the AP 502, with the AoD decreasing with increasing number. The STA 508 may have multiple antennas and different transmit chains associated with each antenna.

Once the symbols are detected, the STA 508 may subsequently estimate the AoD of the direct (line-of-sight) signal. Once the AoD is estimated by the STA 508, a positioning solution can be achieved for the STA 508. The use of a single AP 502 whose location is known, for example, may serve to enable the STA 508 location to be determined in two dimensions, assuming the relative height difference between the AP 502 and the STA 508 height is known. In other embodiments, multiple APs may be used to determine the STA 508 position in three dimensions using triangulation.

As shown in FIG. 5, the AP 502 may have $N_{tx}$ antennas 506 and $N_{chains}$ transmit chains 504 for example. The number of antennas 506 may in some embodiments be equal to or greater than the number of transmit chains 504. In some embodiments, the AP 502 may transmit a single symbol from each antenna 506. For example, the AP 502 may transmit the first symbol using the first antenna (antenna 1) 506. The next $N_{chains}-1$ symbols may be transmitted using the same number of antennas 506 (antenna 2 to antenna $N_{chains}$), using a different antenna 506 to transmit a different symbol. The AP 502 may subsequently switch the transmit chains 504 to use the next set of antennas 506 for transmission of the symbols. This set may be antennas 506 numbered $N_{chains}+1$ to $2N_{chains}$. This may continue until a maximum of $N_{tx}$ symbols are transmitted. In some embodiments, the AoD determination may be performed after $N_{tx}$ symbols are transmitted while in other embodiments, multiple sets of $N_{tx}$ symbols may be used in the AoD determination. When multiple sets of symbols are used, the symbols from each antenna may be aggregated individually and the resulting aggregated symbol from each antenna compared with the aggregated symbols from each other antenna in the AoD determination.

FIG. 6 is a calibration method transmission from an AP in accordance with some embodiments. The transmission 600 may be a packet and may be performed by any of the APs shown in FIGS. 1-5. The packet 600 comprises one or more headers as well as a payload comprising a plurality of symbols. The header may comprise a legacy and/or HE header. The header may also be used to replace or supplement the symbol information in an announcement frame, as indicated above. The packet 600 may be a packet that may contain, for example, 8 or more symbol locations. As shown, data (a symbol) may be transmitted in some of the symbol locations, and in other symbol locations symbols may not be transmitted, as indicated above. Depending on the symbol location, the symbol may be transmitted by one or more antennas and use different sets of antennas by switching the transmit chains.

In particular, the transmit chains may be switched to the antennas numbered [1, $N_{chains}+1:2N_{chains}-1$]. Thus, the first antenna may be used for each symbol that is transmitted, with the initial symbol immediately after the header being transmitted by the first antenna. The first symbol may be transmitted by the first antenna, but not by any other antenna. The symbol transmitted by the first antenna may also be referred to as the correction symbol while the symbol transmitted by the other antennas may be referred to as the AoD symbol. Note that the first antenna is used as an example, in other embodiments, any antenna may be used to transmit the correction symbol. In some embodiments, only a single antenna (e.g., the first antenna as indicated in FIG. 6) may transmit the correction symbol; no other transmitter may transmit the correction symbol. In other embodiments, to ensure that the transmit power remains the same, the antennas used to transmit the AoD symbol after a particular correction symbol may transmit the carrier wave of the tone without the modulation of the correction symbol. Each the correction symbol (transmitted before and after the switching) may be the same. As above, the channel may also remain the same throughout transmission of the packet 600. Since the signal (the correction symbol) and the channel from the first antenna before and after the switching are the same, the STA may be estimate the change in phase and amplitude caused by the switching operation using the correction symbol. This change may be applied to the AoD symbols transmitted by the remaining antennas to normalize the information for AoD calculation by the STA.

As shown, symbols may be transmitted in pairs, a correction symbol and an AoD symbol. The number of pairs in the packet 600 may depend on the number of transmit chains, the number of antennas and the available buffer memory. As shown in FIG. 6, the first symbol transmitted in each cluster may be transmitted using only the first antenna and the next symbol transmitted using the first antenna and other antennas to which the transmit chains have been switched. As above, the same correction symbol may be transmitted in each pair. The AoD symbol may be independent of the correction symbol (the symbols may or may not be the same). In some embodiments, the symbol location of the correction symbol may be the second location or may vary, as indicated by the announcement frame and/or header. In some embodiments, it may be sufficient to transmit the same correction symbol and for the STA to be able to discriminate between the symbol correction location and the AoD symbol location.

In some embodiments, the symbols received before the switching may be indicated as:

$$[h_1 e^{\phi_1} A_1, h_2 e^{\phi_1} A_1 \ldots h_{N_{chains}} e^{\phi_1} A_1],$$

where $h_j$ is the channel from transmit antenna j, and $e^{\phi_1}$, $A_1$ are random phase and amplitude added to all antennas. The symbols after the switching operations can then be indicated as:

$$[h_1 e^{\phi_2} A_2, h_{N_{chains}+1} e^{\phi_2} A_2 \ldots h_{2N_{chains}-1} e^{\phi_2} A_2],$$

where the same notation is used, only now a different global amplitude and phase are present. The STA can estimate the factor $e^{\phi_2} A_2 / e^{\phi_1} A_1$ using the correction symbols transmitted from the first antenna in the first and second pairs of FIG. 6. The STA may then use the factor to correct the phase and amplitude of the AoD symbols after the switching from the remaining antennas. This correction can be calculated immediately once the correction symbol is received after the switching. Once the STA can correct the phases and amplitudes, and has received the AoD symbol, the STA can estimate the AoD of the symbols. As the symbols between the correction-AoD symbol pairs may be unused due to the switching, this may provide sufficient time to perform the correction determination and correction on the AoD symbols, although the first symbol after the switching may be used for the correction symbol to provide the maximum time for the correction calculation.

The phase and amplitude estimation and correction operations may be repeated after each switching of the packet. In some embodiments, the correction factor may be assumed to be the same after every switching in the packet. Thus, only a single pair of correction symbol may be used. In this case, the pair of correction symbols may be disposed in adjacent pairs or at any point within the packet, so long as the STA is provided the information of the correction symbol locations and the number of switchings between the correction symbols. Likewise, the correction to the AoD symbols may be performed on all but one of the AoD symbols. This may reduce the number of symbols used in the packet. In other embodiments, the correction factor may not be assumed to remain constant after every switching in the packet. Thus, the correction symbol may be transmitted in every correction-AoD symbol pair. While any two correction symbols may be used to determine the correction to the corresponding AoD symbol (and correct to a particular AoD symbol), although using the correction symbol pairs of the initial correction symbol after the header and the correction symbol of a particular correction-AoD symbol pair may be relatively simple.

In FIG. 6, a single packet is used for the AoD determination. However, in some embodiments, multiple frames may be used. FIG. 7 is another calibration method transmission from an AP in accordance with some embodiments. As shown, the switching may be performed in the time between transmission of the two packets 700. Multiple packets may be used to reduce the buffer size used in determining the AoD. Similar to the above, the number of packets and number of symbols in the packets in FIG. 7 may depend on the number of transmit chains, the number of antennas and the buffer size—e.g., the larger the buffer, the larger the number of symbols able to be used in a packet and the fewer number of packets for correction and AoD determination.

By buffering the symbols used for the syncing the STA may be able to gain performance in low SNR situations. Without buffering, the calibration method may estimate only the phase and amplitude in the symbols used for the AoD estimation—relative to the syncing symbol for that transmission section. This may be used since the syncing symbol is the same in each transmission section, up to the unknown global phase and amplitude caused by the switching, and maybe some pre-known deterministic factor that the AP already signaled in the announcement frame.

As shown in FIGS. 6 and 7, to reduce the number of transmit chains used to estimate the phase and amplitude changes due to the switching, only a single antenna may be used to transmit the same symbol at the start of each transmission section, following the switching. In addition, fewer than all of the OFDM tones may be used for the estimation of the change in amplitude and phase.

In particular, in some embodiments, estimation of the change in phase and amplitude caused by the switching operation may be performed using a plurality of OFDM tones, such as all of the available tones. In some embodiments, a limited set of OFDM tones may be used by each of multiple antennas to transmit the correction symbol in the correction symbol location. For example, two antennas may be used to transmit the correction symbol in the correction symbol location; one antenna transmitting on every even OFDM tone of the available OFDM tones and the other antenna transmitting on every odd OFDM tone of the available OFDM tones. Other sets of OFDM tones, rather than even and odd, may be used for transmission—such as higher and lower ranges of OFDM tones or sets of OFDM tone ranges. The OFDM tones may be divided equally among the antennas or may be unequal as desired. This may permit the correction symbols from multiple antennas to be compared for correction purposes. Note that the relationship between the AoD and the tones may provided by the codebook in the announcement frame or in another frame, so that only certain tones may be used by particular antennas when transmitting at particular AoDs.

In some embodiments, independent of the number of antennas used to transmit the correction symbol fewer than all of the OFDM tones may be used—for example if severe noise exists on the unused OFDM tones, to increase the signal to noise (SNR) or SINK ratio for the correction symbol. This information may be provided to the STA in the announcement frame or in the header, for example. The use of fewer tones for a correction symbol, however, may degrade the estimation performance.

Thus, the calibration method described may avoid calibration of the entire array at once. Instead, it may be sufficient to obtain the amplitude and phase of the transmission for each antenna for each of the switching configurations relative to each other. Rather than use the calibration method, in other embodiments, a relative phase method may be used. FIG. 8 is a relative phase method transmission from an AP in accordance with some embodiments.

The relative phase method may assume that the amplitude remains substantially constant over at least the packet 800, if not the AoD estimation period. In the relative phase method, the relative phase is determined between pairs of symbols that belong to the same transmission section. As shown in FIG. 8, the packet 800 may include a header, followed by several symbols, each of which may be transmitted by different antennas. The STA can multiply the first and second symbols and add to this total to the multiplication of fifth and sixth symbols. In some embodiments, the first symbol can have an unknown phase if the standard does not force the AP to transmit the headers in specific fashion, such as only using the first antenna. The phase on the first symbol may thus be cancelled before being combined with the remaining. In some embodiments, the headers may be limited to being transmitted in a predetermined manner, for example using only a single antenna while the rest of the antennas connected to the transmit chains transmit only a carrier wave. Although in FIG. 8 a specific antenna is referred to as transmitting the first symbol, other antennas may transmit the same symbol, so long as the number of antennas transmitting the symbol remains limited by the number of transmit chains. The switching may occur after transmission of the last symbol transmitted by the antenna attached to the last of the transmit chains. Similar to FIGS. 6 and 7, transmission may not occur for two or more symbols, depending on the amount of time it takes for the transmitter chains to switch to the new antennas. In the example shown in FIG. 8, a pair of symbols is transmitted before the switching; the number of transmit chains is two. After switching, another pair of symbols may be transmitted.

In other embodiments, the initial symbol after the header may be transmitted by multiple antennas and the initial symbol after the switching may be transmitted by one of the antennas that transmitted the first symbol. The initial symbol after the header may be used both for AoD and the terminal symbol may be used both for AoD and for phase correction. The terminal symbol may be transmitted by a pair of antennas, both of which may be different than the antennas that transmitted the first symbol. The signal provided by one of the antennas of the pair of antennas may be multiplied by the complex conjugate of the other of the antennas of the pair of antennas. This multiplication may cancel a global unknown phase caused by the switching process. The remaining symbols from the antennas of the pair of antennas may then be used along with the first symbol to determine the AoD. The AP may indicate to the STA, either in the announcement frame or the header, which symbols to multiply together and add together. The symbols may be predetermined by the AP to permit the STA to accurately determine the AoD. The relative phase method can reduce the number of symbols for the AoD determination compared with the calibration method, but at the cost of added complexity and reduced performance due to the pre-computation at the AP and the complex multiplication and addition at the STA.

Figure 9:
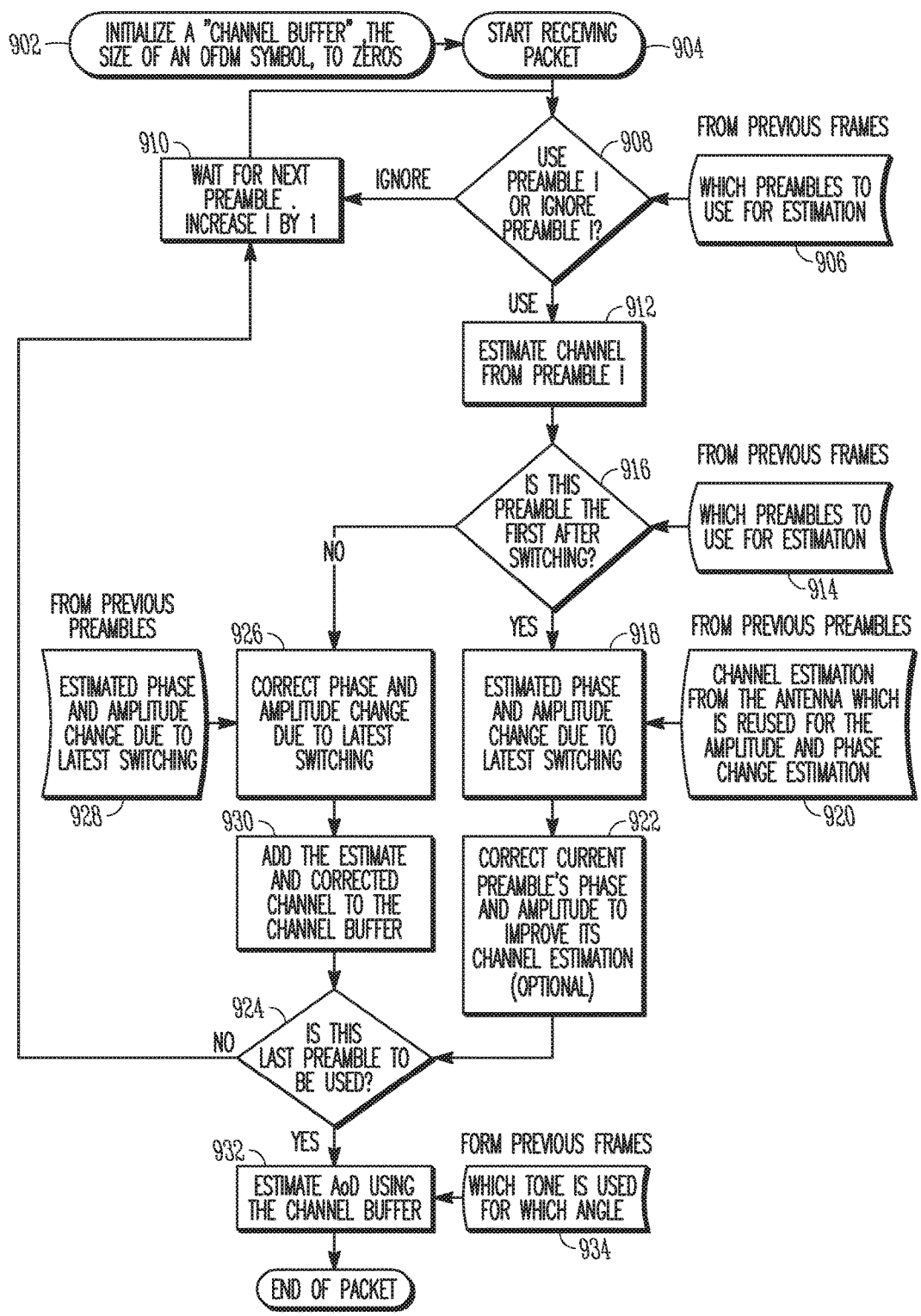

FIG. 9 illustrates a method of determining AoD in accordance with some embodiments. The method may be performed by any of the STAs shown and described in FIGS. 1-5. Embodiments of the method may thus include additional or fewer operations or processes in comparison to what is illustrated in FIG. 9. In addition, embodiments of the method are not necessarily limited to the chronological order that is shown in FIG. 9. The method may be practiced with suitable systems, interfaces and components. In addition, while the method and other methods described herein may refer to STAs operating in accordance with IEEE 802.11 or other standards, embodiments of those methods are not limited to just those STAs and may also be practiced by other mobile devices.

At operation 902, the STA may initialize a channel buffer. The channel buffer may have a predetermined size, such as that of the OFDM symbol. The initialization may set the buffer to 0.

The STA may at operation 904 start receiving the packet. The packet may be provided over some or all of the available OFDM tones. The packet may contain a legacy or HE header frame.

The packet at operation 906 may be preceded by an announcement frame that has been received by the STA. The announcement frame may describe the packet. The announcement frame may include the number of symbols transmitted between each switching operation, the number of symbols used for the switching operation, the codebook that maps the tones in each symbol to their respective physical angles if not set by the standard, and optionally data regarding calibration and/or beamshape patterns that can be used by the STA for the estimation process. The announcement frame may also indicate to the STA that this information may be contained within header fields of the header.

At operation 908 the STA may determine whether to use a particular preamble (i.e., symbol) for AoD determination. The determination for preamble number i may be indicated in one or both the announcement frame or header.

If the STA determines at operation 908 that a particular preamble is not to be used for the AoD determination, the STA may at operation 910 wait for the next preamble. The STA may increment the preamble number i by 1 and return to operation 908 for the next preamble. The STA may ignore the preamble as this signal may be the signal during the transition period between the pair of symbols.

In response to a determination at operation 908 that a particular preamble is to be used for the AoD determination, the STA may at operation 912 estimate the channel for preamble number i. The STA may thus estimate the symbol at this point in time.

The announcement frame may provide additional information than whether a particular frame is not to be used. As indicated, at operation 914 the announcement frame may indicate the specific purpose or position of each symbol.

The STA may use the information in the announcement frame to determine the position of preamble number i. In particular, at operation 916 the STA may determine whether preamble number i is the first symbol after switching has occurred. In other embodiments, a symbol other than the first after switching may be used.

If at operation 916 the STA determines that preamble number i is the first symbol after switching has occurred, the STA may at operation 918 use the symbol in a correction estimation. The STA may specifically use the symbol to determine the phase and perhaps amplitude change due to the latest switching.

As shown in operation 920, the STA may have additional information to obtain the phase and amplitude change. In particular, the STA may use the channel estimation of a symbol previously transmitted by the same antenna prior to the switching. The channel estimation may be that of the transmission immediately preceding the switching or a predetermined number of times prior to the switching.

At operation 922 the STA may correct the phase and/or amplitude of the current preamble. The correction may be based on the change(s) determined in operation 920. In some circumstances, no correction may be performed.

At operation 924, after correction the STA may determine whether additional preambles exist. This is to say that additional antennas are to be tested due to the limited number of transmit chains. If additional antennas are to be tested, the STA may return to operation 910.

At operation 926, the STA determines that preamble number i is not the first symbol after switching has occurred. The STA may then use the correction determined at operation 918 to correct for the phase and/or amplitude of the symbol just received.

At operation 928, the correction determined at operation 918 may be supplied to the STA for the correction at operation 926. As indicated, the latest correction determined at operation 918 (determined at the last switching) may be used at operation 926.

At operation 930, the estimated preamble, which has been corrected, may be added to the buffer. The additional information may be added based on limitations of the buffer. If the buffer is full, additional packets may be used for the ADD determination. After operation 930, the method may continue to operation 924.

If at operation 924 the STA determines that the last preamble to be used has been corrected for, the STA may at operation 932 determine the AoD. The STA may use the information stored in the buffer to determine the AoD of the symbols and determine the STA location.

To determine the AoD at operation 932, the STA may use information about the angle and tone used. The relationship between the angle and tone may be provided by the announcement packet or by the header.

EXAMPLES

Example 1 is an apparatus of a station (STA), the apparatus comprising: a memory; and processing circuitry arranged to: decode a first and second symbol from another wireless device, the first symbol received from a same antenna of the other wireless device; decode a third symbol from a first plurality of antennas of the other wireless device; determine a phase correction based a comparison between the first and second; correct a phase of a fourth symbol from a second plurality of antennas of the other wireless device using the phase correction to produce a corrected symbol, the first and second plurality of antennas being different; and estimate an Angle of Departure (AoD) of the other symbol based on the corrected symbol.

In Example 2, the subject matter of Example 1 optionally includes that the processing circuitry is arranged to: correct the phase and an amplitude of the fourth symbol using the comparison.

In Example 3, the subject matter of Example 2 optionally includes that the first and second symbols are disposed in a packet, the packet comprises a header and a plurality of symbols thereafter, the plurality of symbols comprising pairs of symbols separated by a switching period during which signals received from the other wireless device are ignored.

In Example 4, the subject matter of Example 3 optionally includes that each pair of symbols comprises a correction symbol and an AoD symbol, the correction symbol disposed before the AoD symbol, the first and second symbols being the correction symbols and the third and fourth symbols being the AoD symbols.

In Example 5, the subject matter of Example 4 optionally includes that the correction symbols are received from a single antenna and free from being received by other antennas of the other wireless device, and each AoD symbol is received from a plurality of antennas.

In Example 6, the subject matter of Example 5 optionally includes that the processing circuitry is arranged to: correct the phase and amplitude of the AoD symbol of a particular pair using a comparison between a correction symbol immediately after the header and a correction symbol of the particular pair.

In Example 7, the subject matter of any one or more of Examples 3-6 optionally include that a number of pairs of symbols in the packet is dependent on a number of transmit chains, a number of antennas and an amount of buffer memory in the memory, the buffer memory arranged to store the correction symbols.

In Example 8, the subject matter of any one or more of Examples 3-7 optionally include that the first and second symbols are disposed in different packets, each packet comprises a header and a pair of symbols comprising a correction symbol and an AoD symbol, the correction symbol disposed before the AoD symbol, the first and second symbols being the correction symbols and the third and fourth symbols being the AoD symbols.

In Example 9, the subject matter of any one or more of Examples 1-8 optionally include that the processing circuitry is further arranged to: determine the phase correction using the comparison, the first and second symbol received from a first antenna on a first set of tones and the first and second symbol received from a second antenna on a second set of tones different from the first set of tones.

In Example 10, the subject matter of any one or more of Examples 1-9 optionally include that the processing circuitry is further arranged to: decode at least one packet prior to reception of the first and second symbols, the at least one packet comprising a header, and decode packet information comprising a number of symbols in each set of symbols, a number of symbols between adjacent sets, and a codebook that maps tones in each symbol to respective physical angles, the packet information contained in at least one of: the header, and an announcement frame received prior to the at least one packet.

In Example 11, the subject matter of any one or more of Examples 1-10 optionally include that the processing circuitry is further arranged to: decode a same symbol from different antennas transmitted on different tones in which an AoD for each tone is unique, determine whether phase correction is to be performed on the same symbol of the different tones and correct phases of the same symbol of the different tones in response to a determination that phase correction is to be performed, and estimate the AoD for the different tones through use of a codebook received in an announcement frame prior to a packet containing the first and second symbols, the codebook relating the different tones to the AoD.

In Example 12, the subject matter of any one or more of Examples 1-11 optionally include, further comprising: one or more antennas arranged to receive the symbols from the other wireless device.

Example 13 is an apparatus of a wireless device, the apparatus comprising: a transceiver; and processing circuitry arranged to: cause the transceiver to transmit, to a station (STA) through use of a first antenna, a header and a first symbol; switch transmitter chains between a first set of antennas and a second set of antennas after transmission of the first symbol, a number of transmitter chains being smaller than a number of antennas; after the switch, cause the transceiver to transmit, to the STA through use of the first antenna, another first symbol; and cause the transceiver to receive location information from the STA, the location information based on an angle of departure (AoD) estimate dependent on use of the first symbol and the other first symbol to correct for a phase and amplitude variation caused by the switch.

In Example 14, the subject matter of Example 13 optionally includes that the processing circuitry is further arranged to: avoid transmission during the switch.

In Example 15, the subject matter of any one or more of Examples 13-14 optionally include that the processing circuitry is further arranged to: during the switch, cause the transmitter to transmit a carrier wave and avoid transmission of a symbol.

In Example 16, the subject matter of any one or more of Examples 13-15 optionally include that the processing circuitry is further arranged to: cause the transmitter to transmit a second symbol after both the first symbol and the other first symbol, the second symbol transmitted after the first symbol transmitted by the first set of antennas and the second symbol transmitted after the second symbol transmitted by the second set of antennas, the first and second set of antennas comprising the first antenna.

In Example 17, the subject matter of Example 16 optionally includes that the processing circuitry is further arranged to: cause the transmitter to transmit a packet comprising the header, a first pair of symbols comprising the first symbol and one of the second symbols immediately after the first symbol, and a second pair of symbols comprising the other first symbol and another of the second symbols immediately after the other first symbol, the first and second pair of symbols separated by a switching period during which the transmitter chains are switched between the first and second sets of antennas.

In Example 18, the subject matter of any one or more of Examples 16-17 optionally include that the processing circuitry is further arranged to: cause the transmitter to transmit: a first packet comprising the header and a first pair of symbols comprising the first symbol and one of the second symbols immediately after the first symbol, and a second packet comprising the header and a second pair of symbols comprising the other first symbol and another of the second symbols immediately after the other first symbol.

In Example 19, the subject matter of any one or more of Examples 13-18 optionally include that transmission of the first symbol and the other first symbol is limited to the first antenna.

In Example 20, the subject matter of any one or more of Examples 13-19 optionally include that the processing circuitry is further arranged to: cause the transmitter to transmit: the first symbol from the first antenna on a first set of tones and the other first symbol from the first antenna on the first set of tones, and the other first symbol from a second antenna on a second set of tones and the other first symbol from the second antenna on the second set of tones.

In Example 21, the subject matter of any one or more of Examples 13-20 optionally include that the processing circuitry is further arranged to: transmit, prior to transmission of the header and first symbol, an announcement frame, the announcement frame comprising packet information comprising a number of symbols between adjacent switches of the transceiver chain, a number of symbols over which a particular switch occurs, and a codebook that maps tones in each symbol to respective physical angles.

In Example 22, the subject matter of any one or more of Examples 13-21 optionally include that wherein the wireless device is an access point (AP).

Example 23 is a computer-readable storage medium that stores instructions for execution by one or more processors of a station (STA), the one or more processors to configure the STA to: decode a pair of comparison symbols from a first antenna of an access point (AP); decode a first and second Angle of Departure (AoD) symbol respectively from a first and second set of antennas, wherein the first and second set of antennas comprise different antennas that comprise the first antenna; determine a phase and amplitude correction based on a phase and amplitude change between the first and second comparison symbols; and correct a phase and amplitude of a second AoD symbol from the second set of antennas through use of the phase and amplitude correction to produce a corrected AoD symbol for the second set of antennas.

In Example 24, the subject matter of Example 23 optionally includes that the comparison and. AoD symbols are disposed in a packet that comprises a header, the packet comprising the first comparison symbol and first AoD symbol separated from the second comparison symbol and second AoD symbol by a period during which signals from the AP are ignored.

In Example 25, the subject matter of any one or more of Examples 23-24 optionally include that the first comparison symbol and first AoD symbol are disposed in a first packet that comprises a first header, and the second comparison symbol and second AoD symbol are disposed in a second packet that comprises a second header.

In Example 26, the subject matter of any one or more of Examples 23-25 optionally include that the one or more processors further configure the STA to: decode an announcement frame prior to reception of the first comparison symbol, the announcement frame comprising packet information comprising a number of symbols in each set of symbols comprising a comparison symbol and an AoD symbol, a number of symbols between adjacent sets, and a codebook that maps tones in each symbol to respective physical angles.

Example 27 is a method of estimating an Angle of Departure (AoD) of symbols from a station (STA), the method comprising: decoding a pair of comparison symbols from a first antenna of an access point (AP), a first comparison symbol of the comparison symbols received prior to switching of transmitter chains from a first set of antennas to a second set of antennas and a second comparison symbol of the comparison symbols received after the switching, the first and second set of antennas comprising the first antenna; decoding a first AoD symbol from the first set of antennas; determining a phase and amplitude correction based on a phase and amplitude change between the first and second comparison symbols; correcting a phase and amplitude of a second AoD symbol from the second set of antennas through use of the phase and amplitude correction to produce a corrected AoD symbol for the second set of antennas; and estimating an AoD of the first and second AoD symbols based on the first AoD symbols from the first set of antennas and the corrected AoD symbol from the second set of antennas.

In Example 28, the subject matter of Example 27 optionally includes that one of: the comparison and AoD symbols are disposed in a packet that comprises a header, the packet comprising the first comparison symbol and first AoD symbol separated from the second comparison symbol and second AoD symbol by a switching period during which the transmitter chains are switched between the first and second sets of antennas, and the method further comprises ignoring received signals during the switching period, or the first comparison symbol and first AoD symbol are disposed in a first packet that comprises a first header, and the second comparison symbol and second AoD symbol are disposed in a second packet that comprises a second header.

Example 29 is an apparatus of a station (STA), the apparatus comprising: means for decoding a pair of comparison symbols from a first antenna of an access point (AP), a first comparison symbol of the comparison symbols received prior to switching of transmitter chains from a first set of antennas to a second set of antennas and a second comparison symbol of the comparison symbols received after the switching, the first and second set of antennas comprising the first antenna; means for decoding a first Angle of Departure (AoD) symbol from the first set of antennas; means for determining a phase and amplitude correction based on a phase and amplitude change between the first and second comparison symbols; means for correcting a phase and amplitude of a second AoD symbol from the second set of antennas through use of the phase and amplitude correction to produce a corrected AoD symbol for the second set of antennas; and means for estimating an AOD of the first and second AoD symbols based on the first AoD symbols from the first set of antennas and the corrected AoD symbol from the second set of antennas.

In Example 30, the subject matter of Example 29 optionally includes that one of: the comparison and AoD symbols are disposed in a packet that comprises a header, the packet comprising the first comparison symbol and first AoD symbol separated from the second comparison symbol and second AoD symbol by a switching period during which the transmitter chains are switched between the first and second sets of antennas, and the method further comprises ignoring received signals during the switching period, or the first comparison symbol and first AoD symbol are disposed in a first packet that comprises a first header, and the second comparison symbol and second AoD symbol are disposed in a second packet that comprises a second header.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the subject matter may be referred to herein, individually and/or collectively, by the term "embodiment" merely for convenience and without intending to voluntarily limit the scope of this application to any single inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, UE, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed. Description, with each claim standing on its own as a separate embodiment.

What is claimed is:

1. An apparatus of a station (STA), the apparatus comprising:
a memory; and
processing circuitry arranged to:
decode a first and second symbol from a first antenna of another wireless device;

decode a third symbol from a first plurality of antennas of the other wireless device;
determine a phase correction based a comparison between the first and second symbols;
correct a phase and an amplitude of a fourth symbol from a second plurality of antennas of the other wireless device using the phase correction to produce a corrected symbol, the first and second plurality of antennas being different sets of antennas; and
estimate an Angle of Departure (AoD) of the fourth symbol based on the corrected symbol,
wherein:
the first and second symbols are disposed in a packet, the packet comprises a header and a plurality of symbols thereafter,
the plurality of symbols comprises pairs of symbols separated by a switching period during which signals received from the other wireless device are ignored, and
the first and second symbols are disposed in different packets, each packet comprises a header and a pair of symbols comprising a correction symbol and an AoD symbol, the correction symbol disposed before the AoD symbol, the first and second symbols being the correction symbols and the third and fourth symbols being the AoD symbols.

2. The apparatus of claim 1, further comprising:
one or more antennas arranged to receive the symbols from the other wireless device.

3. An apparatus of a station (STA), the apparatus comprising:
a memory; and
processing circuitry arranged to:
decode a first and second symbol from a first antenna of another wireless device;
decode a third symbol from a first plurality of antennas of the other wireless device;
determine a phase correction based a comparison between the first and second symbols, the first and second symbol received from a first antenna on a first set of tones and the first and second symbol received from a second antenna on a second set of tones different from the first set of tones;
correct a phase of a fourth symbol from a second plurality of antennas of the other wireless device using the phase correction to produce a corrected symbol, the first and second plurality of antennas being different sets of antennas; and
estimate an Angle of Departure (AoD) of the fourth symbol based on the corrected symbol.

4. The apparatus of claim 3, further comprising:
one or more antennas arranged to receive the symbols from the other wireless device.

5. An apparatus of a wireless device, the apparatus comprising:
a transceiver; and
processing circuitry arranged to:
cause the transceiver to transmit, to a station (STA) through use of a first antenna, a header and a first symbol;
switch transmitter chains between a first set of antennas and a second set of antennas after transmission of the first symbol, a number of transmitter chains being smaller than a number of antennas;
after the switch, cause the transceiver to transmit, to the STA through use of the first antenna, another first symbol;
cause the transmitter to transmit a second symbol after both the first symbol and the other first symbol, the second symbol transmitted after the first symbol transmitted by the first set of antennas and the second symbol transmitted after the second symbol transmitted by the second set of antennas, the first and second set of antennas comprising the first antenna;
cause the transceiver to receive location information from the STA, the location information based on an angle of departure (AoD) estimate dependent on use of the first symbol and the other first symbol to correct for a phase and amplitude variation caused by the switch; and
cause the transmitter to transmit at least one of:
a first packet comprising the header and a first pair of symbols comprising the first symbol and one of the second symbols immediately after the first symbol, and a second packet comprising the header and a second pair of symbols comprising the other first symbol and another of the second symbols immediately after the other first symbol, or
the first symbol from the first antenna on a first set of tones and the other first symbol from the first antenna on the first set of tones, and the other first symbol from a second antenna on a second set of tones and the other first symbol from the second antenna on the second set of tones.

6. The apparatus of claim 5, wherein the processing circuitry is further arranged to:
avoid transmission during the switch.

7. The apparatus of claim 5, wherein the processing circuitry is further arranged to:
during the switch, cause the transmitter to transmit a carrier wave and avoid transmission of a symbol.

8. The apparatus of claim 5, wherein:
the first and second pair of symbols are separated by a switching period during which the transmitter chains are switched between the first and second sets of antennas.

9. The apparatus of claim 5, wherein the processing circuitry is further arranged to:
cause the transmitter to transmit:
a first packet comprising the header and a first pair of symbols comprising the first symbol and one of the second symbols immediately after the first symbol, and
a second packet comprising the header and a second pair of symbols comprising the other first symbol and another of the second symbols immediately after the other first symbol.

10. The apparatus of claim 5, wherein:
transmission of the first symbol and the other first symbol is limited to the first antenna.

11. The apparatus of claim 5, wherein the processing circuitry is further arranged to:
cause the transmitter to transmit:
the first symbol from the first antenna on a first set of tones and the other first symbol from the first antenna on the first set of tones, and
the other first symbol from a second antenna on a second set of tones and the other first symbol from the second antenna on the second set of tones.

12. The apparatus of claim 5, wherein the processing circuitry is further arranged to:
transmit, prior to transmission of the header and first symbol, an announcement frame, the announcement frame comprising packet information comprising a number of symbols between adjacent switches of the transceiver chain, a number of symbols over which a particular switch occurs, and a codebook that maps tones in each symbol to respective physical angles.

13. The apparatus of claim 5, wherein:
wherein the wireless device is an access point (AP).

14. A non-transitory computer-readable storage medium that stores instructions for execution by one or more processors of a station (STA), the one or more processors to configure the STA to:
decode a pair of comparison symbols from a first antenna of an access point (AP);
decode a first and second Angle of Departure (AoD) symbol respectively from a first and second set of antennas, wherein the first and second set of antennas comprise different antennas that comprise the first antenna;
determine a phase and amplitude correction based on a phase and amplitude change between the first and second comparison symbols; and
correct a phase and amplitude of the second AoD symbol from the second set of antennas through use of the phase and amplitude correction to produce a corrected AoD symbol for the second set of antennas,
wherein the first comparison symbol and first AoD symbol are disposed in a first packet that comprises a first header, and
the second comparison symbol and second AoD symbol are disposed in a second packet that comprises a second header.

15. The medium of claim 14, wherein:
the first packet comprising the first comparison symbol and first AoD symbol separated from the second comparison symbol and second AoD symbol by a period during which signals from the AP are ignored.

16. The medium of claim 14, wherein the one or more processors further configure the STA to:
decode an announcement frame prior to reception of the first comparison symbol, the announcement frame comprising packet information comprising a number of symbols in each set of symbols comprising a comparison symbol and an AoD symbol, a number of symbols between adjacent sets, and a codebook that maps tones in each symbol to respective physical angles.

* * * * *